United States Patent [19]

Rickman, Jr.

[11] 4,446,912

[45] May 8, 1984

[54] SELECTED SEGMENT HEATING OR COOLING SYSTEM

[76] Inventor: James D. Rickman, Jr., P.O. Box 272, Boxford, Mass. 01921

[21] Appl. No.: 340,198

[22] Filed: Jan. 18, 1982

[51] Int. Cl.³ .......................... F28D 7/00; F24D 3/02
[52] U.S. Cl. ........................................ 165/12; 165/22; 236/46 R; 236/46 F; 236/9 A; 236/37; 237/8 R; 237/63
[58] Field of Search ................. 165/12, 22; 236/46 R, 236/1 B, 37, 9 A, 46 F; 237/63, 8 R

[56] References Cited

U.S. PATENT DOCUMENTS

| | | | |
|---|---|---|---|
| 2,250,330 | 7/1941 | Eastwood et al. | 237/63 |
| 3,109,486 | 11/1963 | Hansen | 165/12 |
| 3,170,630 | 2/1965 | Chadwick | 236/1 B |
| 3,384,155 | 5/1968 | Newton | 165/12 |
| 3,425,485 | 2/1969 | Newton | 165/22 |
| 3,875,995 | 4/1975 | Mannion et al. | 165/22 |
| 3,910,345 | 10/1975 | Whalen | 165/22 |
| 4,226,364 | 10/1980 | Utesch | 237/13 |
| 4,320,870 | 3/1982 | Manor | 236/37 |
| 4,364,512 | 12/1982 | Morrison | 417/12 |

Primary Examiner—William R. Cline
Assistant Examiner—John M. Kramer
Attorney, Agent, or Firm—Joseph S. Iandiorio

[57] ABSTRACT

A selected segment heating system including: means for heating a fluid; conduit means for conducting the fluid from the outlet to the return inlet of the means for heating through a plurality of areas; means, interconnected with the conduit, for moving the fluid through the conduit; gauging means for operating the means for moving to move a segment of the heated fluid in the conduit as far as the return point of the farthest area to be heated; and delay means for suspending operation of the means for moving for permitting a predetermined heat exchange to occur between the heating fluid and the air in the area to be heated. Alternately, there may in addition be a source of cooler fluid; valve means; gauging means for selectively interconnecting the means for moving with either the means for heating or the source of cooler fluid for establishing heated fluid segments in conduits located in the areas to be heated and unheated, cooler segments in the other areas; and delay means for suspending operation of the means for moving for permitting a predetermined heat exchange to occur between the heating fluid and the air in the area to be heated. A selected segment cooling system is also disclosed.

21 Claims, 4 Drawing Figures

SELECTED SEGMENT HEATING OR COOLING SYSTEM

FIELD OF INVENTION

This invention relates to temperature control arrangements and methods, and more particularly to multi-zone temperature control systems and methods for controlling temperature and other factors in each of a plurality of rooms, zones or areas.

BACKGROUND OF INVENTION

It is often desirable to maintain different areas or rooms in a building at different temperatures. For example, rooms used extensively typically require a higher level of heating or cooling than rooms which are less used. Some rooms in a centrally heated building may be heated by auxiliary heating means such as a wood stove. This creates a requirement for a central heating system that can deliver heat energy to rooms on a room-by-room basis. Present systems for heating or cooling selected areas typically deliver a working fluid to a zone of areas through a single circulating loop. Room-by-room temperature control within a single circulating loop is typically established by the use of by-pass piping and thermostatically controlled valves connected to the system at each room.

The complexity, large number of parts, and time required to install room-by-room temperature control systems leads to a high system cost. Modification of conventionally zoned single circulating loop systems to provide room-by-room temperature control requires professional plumbing and electrical skills.

SUMMARY OF INVENTION

It is therefore an object of this invention to provide a heating or cooling system which maintains each one of a number of areas at a different desired temperature level.

It is a further object of this invention to provide such a heating or cooling system for effecting individual area-by-area temperature control in a plurality of areas serviced by a single circulating loop system.

It is a further object of this invention to provide such a heating or cooling system which does not require complex bypass or branch conduits or valving apparatus for directing heated or cooled fluid to selected individual rooms.

It is a further object of this invention to provide such a heating or cooling system which is relatively inexpensive and simple to install and maintain and which may be readily integrated with existing heating systems.

It is a further object of this invention to provide such a heating or cooling system which automatically maintains individual areas at different desired temperature levels for predetermined time intervals.

It is a further object of this invention to provide such a heating or cooling system which heats or cools a plurality of areas to a temperature desired for each area, without having to individually monitor the temperature in each area.

It is a further object of this invention to provide such a heating or cooling system which incorporates each of the foregoing objects and which may be used to heat or cool multiple zones.

Further objects and advantages include the attainment of personal comfort and fuel savings by means of efficient temperature control with a selected segment heating or cooling system.

This invention results from the realization that area-by-area temperature control can be obtained in a single circulating loop, without the need for complex valving, sensing, and bypassing conduits, by gauging the output of the working fluid through the system conduits so that the fluid only goes as far as those rooms which are to be heated or cooled and no farther. After a suitable delay to allow for heat exchange another cycle can begin.

If the rooms to be heated are interspersed in the circulating loop with rooms that are not to be heated or can be heated to a lower temperature, then a pattern of heated and unheated or less heated segments of fluid can be established in the conduits in the same pattern as the areas or rooms which are serviced by the heating system. An analogous approach can be used to construct a cooling system.

This invention features a simple selected segment heating system including means for heating a fluid and conduit means for conducting the fluid from the outlet to the return inlet of the means for heating through a plurality of areas. There are means interconnected with the conduit for moving the fluid through the conduit. Gauging means operate the means for moving to move a segment of the heated fluid in the conduit as far as the return point of the farthest area along the conduit to be heated. Delay means suspend operation of the means for moving until heat exchange has taken place. The same concepts apply to a cooling system.

In a preferred embodiment, the gauging means and delay means may include timer means or a conduit thermostat located at the return point of the farthest area to be heated. The system may include a thermostat in one of the areas for indicating when the air temperature therein has fallen below a predetermined level. There may also be a second conduit which services a second plurality of areas. In addition, there are zone valve means for selectively enabling the means for moving to move the fluid through the second conduit. The gauging means operates the means for moving and the zone valve means to move a segment of the heated fluid in the second conduit as far as the return point of the farthest area of the second areas to be heated to a higher temperature. In other words, the system will operate with a second or additional zones.

The invention also features a patterned selected segment heating system having means for heating a fluid and conduit means for conducting the fluid from the outlet to the return inlet of the means for heating through a plurality of areas. Means interconnect with the conduit for moving the fluid through the conduit. There is a source of cooler fluid and valve means. Gauging means control valve means to selectively interconnect the inlet of the moving means with the source of cooler fluid or the means for heating in order to establish a series of hotter and cooler segments in the conduit and move the hotter segments to the areas to be heated to higher temperatures and the cooler segments to the other areas. Delay means suspend operation of the means for moving until heat exchange has taken place.

In a preferred embodiment, the source of cooler fluid may be the return portion of the conduit which feeds the return inlet of the means for heating, and the gauging means may include a controller such as a microprocessor and may include a timer means and conduit thermostats. There may be thermostat means in one of the areas for indicating when the air temperature therein has fallen below a predetermined level. The same concepts apply to a cooling system.

The above described system, which intersperses a pattern of hotter and cooler segments throughout multiple areas, may also operate with a second or additional zones. Second conduit means are interconnected with the means for moving for conducting the fluid through a second plurality of areas. Zone valve means selectively enable the means for moving to move fluid through either the first or second conduit means. The gauging means may include a controller such as a microprocessor and may include timer means and conduit thermostats, and selectively interconnects the inlet of the moving means with the source of cooler fluid or the means for heating, and the outlet of the moving means with the second conduit, in order to establish a series of hotter and cooler segments in the selected second zone.

DISCLOSURE OF PREFERRED EMBODIMENT

Other objects, features and advantages will occur from the following description of a preferred embodiment and the accompanying drawings, in which.

Figure 1:
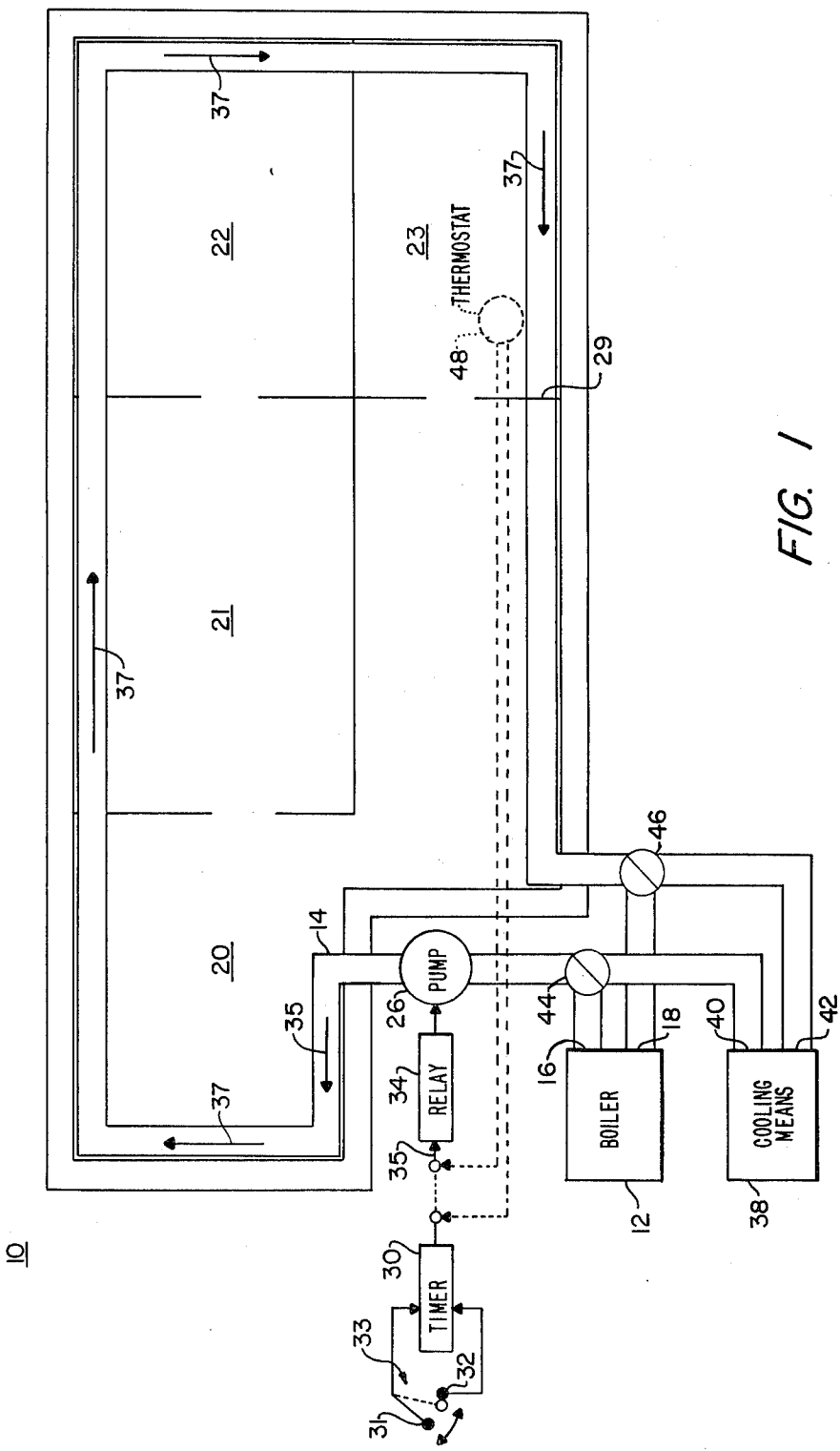
FIG. 1 is a diagrammatic view of a simple embodiment of a selected segment heating and cooling system according to this invention.

There is shown in FIG. 1 a simple selected segment heating and cooling system 10. A means for heating such as boiler 12 is interconnected to conduit 14, which conducts fluid such as water from outlet 16 to return inlet 18 of boiler 12 through a plurality of areas such as rooms 20, 21, 22, 23 and 24. Pump 26 is interconnected with conduit 14 for moving fluid through conduit 14 from outlet 16 to return inlet 18 of boiler 12. Gauging means such as timer 30 controls the operation of pump 26 in order to move heated fluid such as water through conduit 14 as far as the return point of the farthest room along the conduit to be heated, but no farther. Timer 30 also provides delay means to suspend operation of the pump for the time required for heat exchange to take place between the fluid and the room air.

To heat rooms 20–23 to a desired level, pump 26 must be operated to deliver hot water through room 23, i.e., to point 29 of conduit 14. The time interval over which pump 29 must operate is predetermined and programmed into timer 30. After the heated water reaches point 29, the timer stops the pump for the time required for heat exchange to take place between the heated water and the air. The delay time interval required for the water temperature of a hot water system to drop from 165 degrees F. to 90 degrees F., typically 15–20 minutes, is implemented in the preferred embodiment. The timer provides a delay period during which the pump cannot be restarted to deliver the gauged amount of heated fluid.

A thermostat 48 may be provided in any of the rooms, such as room 23, to provide a limiting temperature. If thermostat switch 48 is wired in series with the timer control line 35 to pump relay 34, the pump will not operate unless contacts 105 and 103 of the thermostat switch are closed. The temperature setting of thermostat 48 therefore determines a room air temperature above which the selected segment heating system does not deliver heat to the rooms.

In operation, when the temperature in room 23 drops below a desired level, and contacts 31 and 32 of timer switch 33 are manually closed, the preset pump-on, pump-off timing cycle commences. Timer 30 activates relay 34 via line 35 to operate pump 26 for the initial predetermined time. Pump 26 pumps hot water in the direction of arrows 37 to point 29. After the time required for the heated water to reach point 29, the pump is turned off for the second preset time interval to allow for the required heat exchange. The timed pump-on, pump-off cycle is then repeated.

As each fresh segment of heated water is pumped to fill the conduit through room 23, it pushes the previously pumped segment, which by this time has cooled, ahead through conduit 14. The cycle may be continued for as long as additional heat is required. To stop the cycling altogether, contacts 31 and 32 of switch 33 are opened.

By adjusting the frequency at which the pump is turned on, i.e., the period of each pump-off interval, one may control the temperature at which the areas are maintained. More frequent pump-on periods, i.e., a shorter pump-off time period, increases the average temperature of the water maintained in the conduits and thus maintains the rooms at a higher temperature. Conversely, less frequent pump-on intervals or longer pump-off times permit a greater water temperature drop and maintain the rooms at a cooler temperature. Note that the actual pump-on time will be the same for each cycle, regardless of the frequency at which each pump-on period occurs.

The system may be set to deliver heated fluid only to rooms 20, 21, and 22 or rooms 20 and 21, or room 20 alone, by predetermining fluid delivery times to these room combinations and resetting the timer accordingly.

Additional heating zones similar to the one shown in FIG. 1 may be regulated by the selected segment timer scheme by simply installing additional timers in series or parallel with the zone thermostats. In some systems the timer may regulate the action of zone solenoid valves interconnected in the conduit system in addition to the pump relay.

Cooling means 38 are also connected to conduit 14 at outlet 40 and return inlet 42 to enable cooling in a manner analogous to the previously described heating. Again, the pump-on time is set to deliver cooled water to the rooms to be cooled whereas the time programmed for the pump-off portion of the cycle is that required to allow the cooled water to absorb of heat from the room. Valves 44 and 46 are adjustable to provide for selective interconnection of the heating or cooling means with conduit 14. In this manner, either the heating or cooling mode of the system may be selected.

Figure 2:
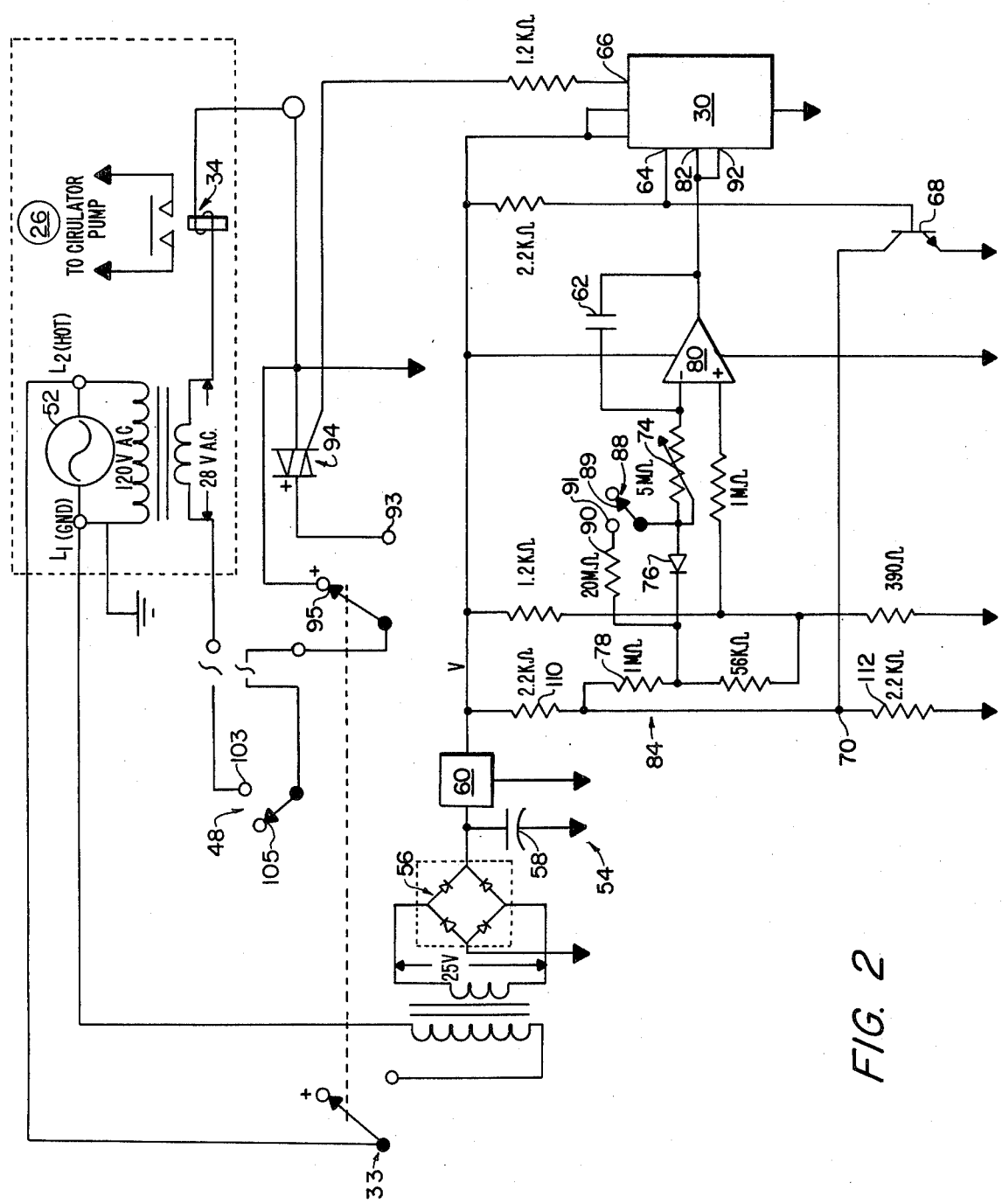
FIG. 2 is a schematic view of the circuitry for the timing means of FIG. 1.

The circuitry of timer 30 operates as shown in FIG. 2. Closing switch 33 connects the circuitry to an A.C. source 52 and closes contacts 93 and 95 placing TRIAC 94 in series with thermostatic switch 48. A regulated power supply 54 comprising bridge 56, capacitor 58, and regulator 60, converts the alternating current signal to a direct current voltage V which is provided to the timer circuitry. As power is provided, capacitor 62 charges and discharges terminal 64 and output terminal 66 of timer 30 to maintain a high state. Transistor 68 is thereby caused to conduct and point 70 is brought to ground potential. Current flows from capacitor 62 through variable resistor 74, diode 76 and resistor 78 to ground point 70. The voltage at the inverting input of amplifier 80 is reduced, causing amplifier 80 to produce a positive output which increases linearly with time. When the output reaches two thirds the supply voltage V at threshold terminal 82, the discharge portion of the cycle commences: discharge terminal 64 and output terminal 66 are brought to a low state. In response to discharge terminal 64 going low, transistor 68 shuts off. Point 70 will be at a potential of V/2 due to the presence of voltage divider 84 comprising resistors 110 and 112. Capacitor 62 is discharged by current flow from point 70 through resistor 78 and variable resistor 74. Switch 88 permits this discharge to occur through resistor 90 when the switch contacts 89, 91 are closed, or through diode 76 when open. When switch 88 is open, only reverse bias leakage current through diode 76 reaches capacitor 62. However, when switch 88 is closed, current flows through resistor 90, thereby reducing the discharge time substantially. For example, with switch 88 open discharge may take twenty minutes, but with switch 88 closed such time may only be six minutes.

As capacitor 62 discharges, the output of amplifier 80 decreases linearly with time until it reaches a value of V/3. When trigger terminal 92 of timer 30 senses this input, discharge terminal 64 and output terminal 66 are brought to a high state. The charging portion of the foregoing cycle is repeated.

The higher level voltage at the output terminal 66 during the charging portion of the cycle enables TRIAC 94 to conduct current and completes the pump relay circuit through the timer to the thermostat. If contacts 105 and 103 of thermostatic swtich 48 are closed, current from A.C. source 52 is delivered to activate relay 34 which operates pump 26. During discharge the lower voltage state at output terminal 66 causes TRIAC 94 to enter a nonconducting state, thereby cutting off power to relay 34 and halting operation of pump 26.

The foregoing circuitry enables discharge and charging times, and therefore "pump on" and "pump off" times, to be adjusted. Variable resistor 74 can be adjusted to provide the variable charging ("pump on") time of, for example, fifteen seconds to three minutes. As previously stated, closing or opening switch 88 allows for variation of the discharge ("pump off") time.

Alternative timer circuits that employ programmable microprocessor controllers can provide automatic activation or deactivation of the selected segment heating system according to the time of day. An example of a microprocessor adaptable to this invention is an Intel 8022. This device is a single chip model with two onboard timers, ROM and RAM. One timer can keep track of the time of day while the other is used to control pumping time intervals.

Figure 3:
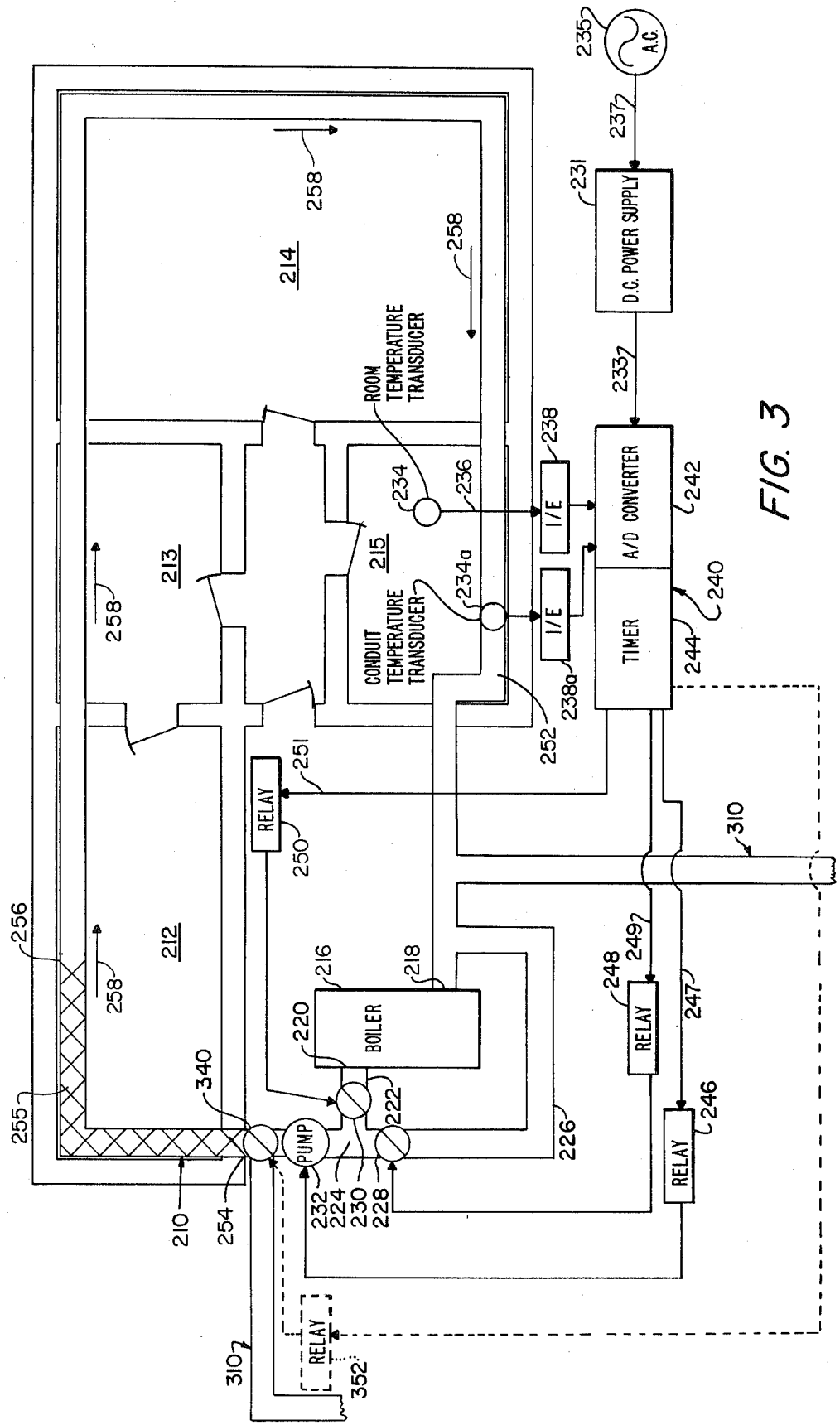
FIG. 3 is a diagrammatic view of a patterned embodiment of a selected segment heating or cooling system wherein interspersed relatively hotter or cooler segments of fluid are directed to selected individual rooms.
Figure 4:
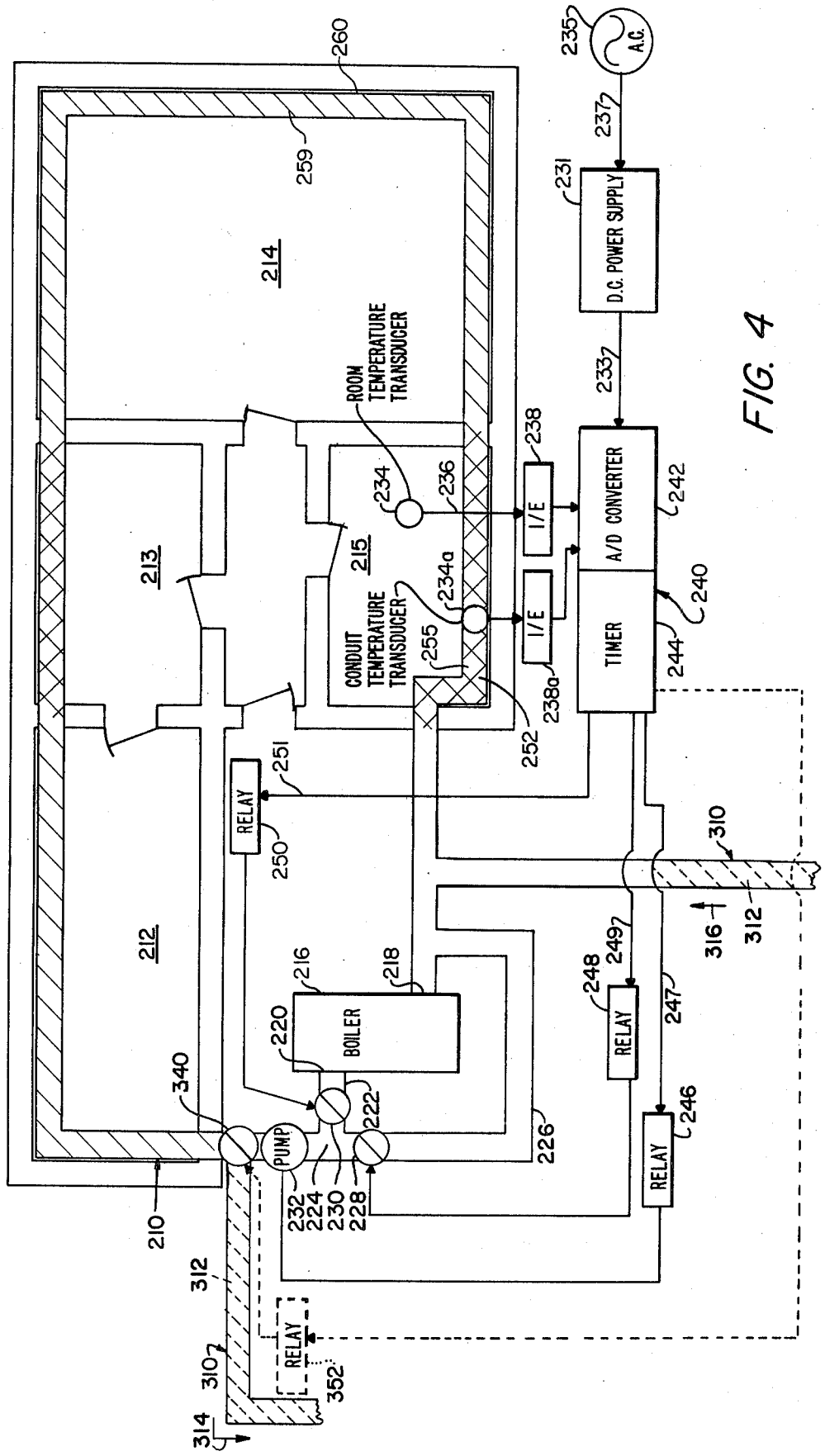
FIG. 4 is a diagrammatic view of the system of FIG. 3 following completed delivery of each hotter and cooler segment to its destined area.

FIGS. 3 and 4 illustrate a patterned selected segment heating system according to this invention in which alternating segments of both heated and cooled fluid, such as water, are pumped through conduit 210 in order to maintain rooms 212-215 at relatively warmer and cooler temperatures. Hot water is provided by boiler 216. Water returning from passage through conduit 210 enters inlet 218 and, after it is heated, exits from outlet 220. Conduit portion 222 extends from outlet 220 to join conduit 210 at point 224. A relatively cooler water source comprises water which has circulated through the system and thus lost much of its heat through dissipation. This water is directed through bypass conduit portion 226 around boiler 216 to join conduit 210 at point 224. Valves 228 and 230 allow for selective access of either heated or cooled water to conduit tube 210. Pump 232 moves the water segments through the conduit system. Power supply 231 provides D.C. power to a microprocessor 240 through line 233 and to various relays through lines which have been omitted for clarity. A.C. supply 235 is connected to power supply 231 via line 237.

The system operates as follows: a temperature transducer 234 in room 215 senses the temperature therein and responds by sending a current through line 236. This current is converted to voltage by converter 238 and monitored by microprocessor 240. A/D converter 242 of microprocessor 240 converts the analog signal to a digital signal. When the signal indicates that the temperature has dropped below a predetermined level, i.e. a level which has been programmed into the microprocessor, microprocessor timer 244 is triggered to activate relays 246, 248 and 250 through lines 247, 249 and 251, respectively. Relay 246 operates pump 232; relay 248 closes valve 228; and relay 250 opens valve 230, so that heated water is pumped into conduit 210 but cooled water from bypass conduit 226 is prevented from entering conduit 210. Timer 244 is programmed so that valve 230 will be opened for only the amount of time required to deliver enough heated water into the conduit as will eventually fill section 252 of conduit 210, corresponding to room 215. After the predetermined time necessary to accomplish this task, relay 250 is caused to close valve 230. The measured segment 255 of heated water destined for room 215 is shown in FIG. 3 as between points 254 and 256 of conduit 210, and is represented by the double crosshatched segment 255 thereof. Cooler segments are shown in simple crosshatch. Timer 244 then operates relay 248 to open valve 228. Cool water enters conduit 210, pushing the segment of heated water ahead in the direction of arrows 258 through the system. Again, timer 244 is programmed so that a segment 259 of cool water measured to eventually precisely fill just section 260 of conduit 210 within room 214 is delivered into the conduit. Subsequent segments of hot and cool water are then pumped in a similar timed manner. Each segment pushes forward the segments ahead of it. Finally, as shown in FIG. 4, each segment is pushed into the section of conduit 210 corresponding to the area to which it is assigned. Timer 244 then shuts off pump 232 for a predetermined time in order to allow for heat exchange between the water and room air. Subsequent repetitions of the cycle are repeated if thermostat 234 indicates that the temperature remains below the desired level.

Alternatively, transducer 234 may be placed in one of the cooler rooms such as room 214 so that the cycle will commence when the temperature of room 214 falls below the desired cooler temperature level. Further, room 215 may be maintained at a cooler temperature by reprogramming the timer to deliver cooler segments first. This is done simply by causing timer 244 to open valve 228 initially, thereby providing a cool segment of water to room 215.

A conduit temperature transducer 234a can be mounted on conduit 210 and coupled to microprocessor 240 by current to voltage converter 238a to provide an indication of the occurrence of a predetermined heat exchange between the fluid in the conduit and the air to be heated and the arrival of heated or cooled water.

The room temperature level in the patterned selected segmented system can be controlled by adjusting the pumping frequency as previously described for the simple system. The above-described system utilizing alternating segments of warmer and cooler water can be utilized as a cooling system simply by making the adaptations previously described herein. Similarly, the above systems may serve to heat or cool multiple zones. As shown in FIGS. 3 and 4, a second conduit 310 (only a portion of which is shown for clarity) may be interconnected with the pump 232 and boiler 216 in order to heat a second, unpictured plurality of areas. The second zone may be identical with the one shown. As shown in FIG. 4, fluid 312 is moved through conduit 310 in the direction of arrow 314 to the second zone of areas and after completing the desired heat exchange the fluid returns as indicated by arrow 316. Zone valve 340 selectively interconnects pump 232 and boiler 220 with either conduit 210 or conduit 310. The zone valves may be operated either manually or automatically by timer 244 and relay 352.

In any of the heretofore described embodiments in which a microprocessor is described as utilized, there may alternatively be provided one of a number of simple timing devices. Such timing devices are responsive to the thermostat or other input and include relay actuators for operating the pump and appropriate valves.

Other embodiments will occur to those skilled in the art and are within the following claims:

What is claimed is:

1. A selected segment heating system comprising:
   a source of hotter fluid;
   conduit means for conducting said fluid from the outlet to the return inlet of said source of hotter fluid through a plurality of areas;
   means, interconnected with said conduit, for moving said fluid through said conduit;
   gauging means for controlling the operation of said means for moving to move a segment of said heated fluid in said conduit as far as the return point of the farthest area along the conduit of said areas to be heated; and
   delay means for suspending operation of the means for moving for permitting a predetermined heat exchange to occur between the heating fluid and the air in the area to be heated.

2. The selected segment heating system of claim 1 in which said gauging means includes timer means.

3. The selected segment heating system of claim 1 in which said gauging means includes conduit thermostat means.

4. The selected segment heating system of claim 1 further including thermostat means in at least one of said areas for indicating when the air temperature therein has fallen below a predetermined level, said gauging means being responsive to said thermostat means.

5. The selected segment heating system of claim 1 further including second conduit means, interconnected with said means for moving, for conducting said fluid from said outlet to said return inlet of said a source of hotter fluid through a second plurality of areas, and zone valve means for selectively enabling said means for moving to move fluid through said second conduit means, said gauging means operating said means for moving to move a segment of said heated fluid in said second conduit as far as the return point of the farthest area along the second conduit of said second areas to be heated.

6. The selected segment heating system of claim 1 in which said delay means includes timer means.

7. The selected segment heating system of claim 1 in which said delay means includes conduit thermostat means.

8. The system of claim 1 in which said conduit means are arranged in series.

9. The system of claim 5 in which said conduit means are arranged in series.

10. A selected segment heating system comprising:
    a source of hotter fluid;
    conduit means for conducting said fluid from the outlet to the return inlet of said source of hotter fluid through a plurality of areas;
    means interconnected with said conduit for moving said fluid through said conduit;
    a source of cooler fluid;
    valve means;
    gauging means for controlling the operation of said valve means to selectively interconnect the means for moving with either the outlet of the source of hotter or the source of cooler fluid and establishing a series of hotter and cooler segments in said conduit and for operating the means for moving to move the hotter segments to each said area to be heated to higher temperatures and the cooler segments to the other areas; and
    delay means for suspending operation of the means for moving for permitting a predetermined heat exchange to occur between the heating fluid and the air in the area to be heated.

11. The selected segment heating system of claim 10 in which said source of cooler fluid is the return portion of said conduit feeding said return inlet of said means for heating.

12. The selected segment heating system of claim 10 in which said gauging means includes microprocessor controller means.

13. The selected segment heating system of claim 10 in which said gauging means includes conduit temperature transducer means.

14. The selected segment heating system of claim 10 further including temperature transducer means in at least one of said areas for indicating when the air temperature therein has fallen below a predetermined level, said gauging means being responsive to said temperature transducer means.

15. The selected segment heating system of claim 10 in which said delay means includes microprocessor controller means.

16. The selected segment heating system of claim 10 in which said delay means conduit temperature transducer means.

17. The selected segment heating system of claim 10 further including second conduit means, interconnectd with said means for moving, for conducting said fluid from said outlet to said return inlet of said source of hotter fluid through a second plurality of areas, and zone valve means for selectively enabling said means for moving to move fluid through said second conduit means, said gauging means for operating said zone valve means to selectively interconnect said second conduit means with one of said source of hotter fluid and said source of cooler fluid for establishing a series of hotter and cooler segments in said second conduit and disposing the hotter segments in said second areas to be heated to higher temperatures and the cooler segments in the other second areas.

18. The system of claim 17 in which said conduit means are arranged in series.

19. The system of claim 10 in which said conduit means are arranged in series.

20. A selected segment heating system comprising:

a source of hotter fluid;

conduit means for conducting said fluid from the outlet to the return inlet of said source of hotter fluid through a plurality of areas;

thermostat means in at least one of said area for indicating when the temperature therein has fallen below a predetermined level;

means, in response to said thermostat means indicating that the temperature has fallen below a predetermined level, for moving said fluid through said conduit;

a source of cooler fluid;

valve means;

gauging means for operating said valve means, responsive to said thermostat means indicating the temperature has risen above a predetermined level, to selectively interconnect the means for moving with either the outlet of the source of hotter or the source of cooler fluid for establishing a series of cooler and warmer segments in said conduit, and for operating the means for moving to move the hotter segments in each said area to be heated to higher temperatures and the cooler segments in the other areas; and delay means for suspending operation of the means for moving for permitting a predetermined heat exchange to occur between the heating fluid and the air in the area to be heated.

21. The system of claim 20 in which said conduit means are arranged in series.

* * * * *